United States Patent [19]

Heller, Jr. et al.

[11] 3,902,940

[45] Sept. 2, 1975

[54] ART OF JOINING FOAMED MEMBERS

[75] Inventors: William C. Heller, Jr., Milwaukee, Wis.; Alfred F. Leatherman, Columbus, Ohio

[73] Assignee: William C. Heller, Jr., Milwaukee, Wis.

[22] Filed: Mar. 31, 1972

[21] Appl. No.: 239,920

Related U.S. Application Data

[63] Continuation-in-part of Ser. No. 882,920, Dec. 8, 1969, abandoned.

[52] U.S. Cl. .................. 156/79; 156/98; 156/272; 156/293; 264/25; 264/36; 264/45.3
[51] Int. Cl.² B29D 27/00; B32B 35/00; H05B 9/02
[58] Field of Search ......... 156/272, 273, 77, 78, 79, 156/293, 294, 94, 98; 264/41, 45, 25, 26, 46, 54, 36, 51, 53, 45.1, 45.3; 219/10.41, 10.53; 161/159

[56] References Cited
UNITED STATES PATENTS

| | | | |
|---|---|---|---|
| 2,393,541 | 1/1946 | Kohler | 260/37 M |
| 2,993,871 | 7/1961 | Shannon et al. | 156/79 X |
| 3,086,247 | 4/1963 | Rubens | 260/41 B |
| 3,106,751 | 10/1963 | Fish | 52/408 |
| 3,345,439 | 10/1967 | Everard et al. | 264/26 |
| 3,391,846 | 7/1968 | White | 264/25 |
| 3,461,014 | 8/1969 | James | 156/272 |
| 3,620,875 | 11/1971 | Guglielmo, Sr. et al. | 156/273 X |
| 3,709,775 | 1/1973 | James | 156/272 |
| 3,730,804 | 5/1973 | Dickey | 156/272 |

*Primary Examiner*—Charles E. Van Horn
*Assistant Examiner*—M. G. Wityshyn
*Attorney, Agent, or Firm*—Andrus, Sceales, Starke & Sawall

[57] ABSTRACT

Controlled foaming and increase in volumetric dimensions of a number of plastic and other foam compositions is produced by dispersing or interspersing in a mass of such materials small susceptor particles which are quickly responsive to thermo-hysteretic induction heating. The susceptor particles are preferably interspersed or homogeneously added and admixed with heat-foaming plastic compositions or in predetermined portions thereof, where substantial increase in volumetric size and production of closed cells are desired. The composition with the susceptor particles therein is then subjected to the alternating magnetic field produced by a suitable induction coil, resulting in immediate heating of the susceptor particles and the foamable material contingent to the individual particles.

The composition may be used to join foam members. The composition is applied to contiguous surfaces to be joined and exposed to the alternating magnetic field to heat the particles, expand the foamable liquid, and join the foam members together.

9 Claims, 7 Drawing Figures

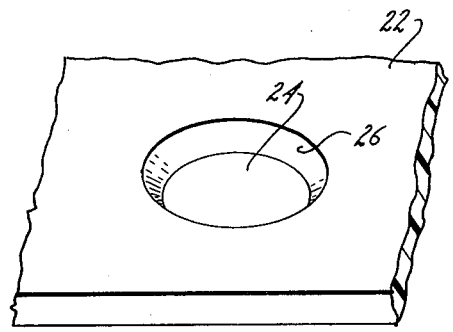
FIG_4
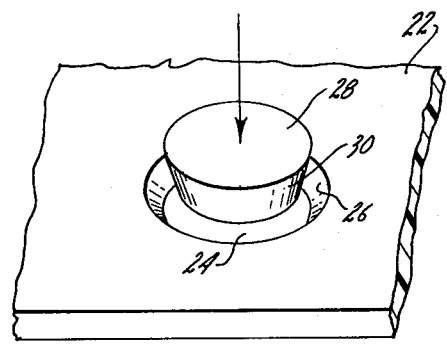
FIG_5
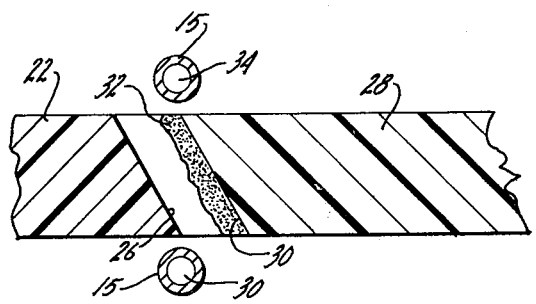
FIG_6
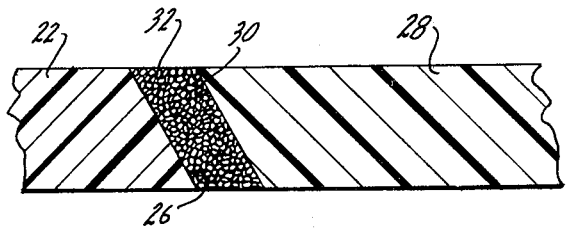
FIG_7

ART OF JOINING FOAMED MEMBERS

CROSS REFERENCE TO RELATED APPLICATION

This application is a continuation-in-part application of U.S. Pat. application Ser. No. 882,920 filed Dec. 8, 1969, and now abandoned.

BACKGROUND OF THE INVENTION

1. Field of the Invention

The present invention relates to an improved technique for expanding foamable composition and more particularly to the joinder of foam members and to compositions suitable for effecting such joinder.

2. Description of the Prior Art

Heat-foamed plastics and the like have been extensively employed in the past for insulating, acoustical, bouyancy and other purposes. Production of heat-responsive foaming and volumetric changes of the materials in the past has been achieved by such heat sources as ovens, torches and application of flame. In recent years an improvement worthy of some mention has been the use in some instances of dielectric heating as well as treatment of material by microwaves to generate heat in polar materials by means of the well-known electric polarization mechanisms.

However, these prior art methods have proven generally unsatisfactory in that they fail to uniformly control the foaming causing mal-productions often referred to as "bread molding," and "skin effects," and causing nonuniform rise and nonuniform cell size production in the finished product.

These mal-productions may be due to a locally inadequate amounts of blowing agent, insufficient heat, or numerous other reasons. The damaged area and its immediate surroundings may be cut out by means of a uniform die, and a plug of foam cut to the same shape as the die inserted to fill the cut out area. However, if a conventional adhesive is used to try to hold the plug in place, poor results are likely because the cells of the foam reduce the available area of contact for bonding. The adhesive may also destroy the uniform texture of the foam article or other properties thereof.

SUMMARY OF THE PRESENT INVENTION

It is therefore an object of our invention to provide an economical and highly efficient novel method for instantly heat-foaming numerous plastic and other materials to produce uniformly controlled results and eliminate the problems now present in prior art methods.

It is a further object to provide a foam generation process that does not require the transfer of heat through the entire mass of the body or portion of the body to be foamed, but which produces heat locally at the locations of the many thousands of susceptor particles which are substantially uniformly interspersed or embedded in the foamable material, thus accentuating the development of small cells of high population without application of heat throughout the general mass.

A further object is the provision of a foaming method of the class described which can control and prevent overheating of the foamable material.

It is, a further object of the present invention to provide an improved technique for joining foamed members.

In our concepts of the present invention, preferred susceptor particles of the types hereinafter set forth and having magnetic thermo-hysteretic losses are added, embedded, impregnated or homogeneously admixed with plastics or other chemical compositions which will produce gas liberation or other foam-development processes under the influence of heat.

In the next step of our method, the said materials with the susceptor particles uniformly or homogeneously interspersed therein are subjected to an intensive magnetic induction field to produce expansion of the composition.

More particularly, the present invention contemplates the application of a foamable liquid containing inductively heatable susceptor particles to at least one of surfaces to be joined. After application, the joinder area is exposed to an alternating magnetic field to heat the particles and expand the foamable liquid.

The foamable liquid is a non adhesive liquid and the mechanical compression and interlocking of the members produced by the expansion of the liquid relied on for joinder.

BRIEF DESCRIPTION OF THE DRAWING

FIG. 4 is a perspective view of a portion of a foamable sheet having a cut out area therein.

FIG. 5 shows a step in the process of the present invention, said step comprising inserting a plug coated with a foamable liquid composition into the cut out area of the sheet.

FIG. 6 is a detailed cross sectional view showing the sheet and plug and the additional step of exposing the contiguous surfaces thereof to an alternating magnetic field.

FIG. 7 is a detailed cross sectional view showing a portion of the sheet and plug at the conclusion of the process of the present invention.

DESCRIPTION OF THE PREFERRED EMBODIMENT

Figure 1:
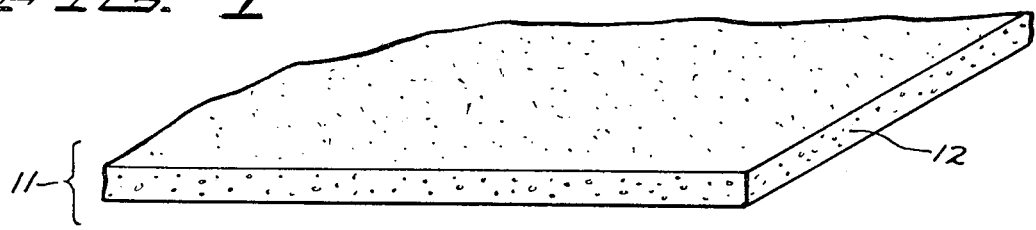
FIG. 1 is a fragmentary perspective view on an enlarged scale showing a pre-formed specimen of heat-foaming plastic body or mass which has homogeneously embedded or impregnated therein a dispersion of selected susceptor particles.

The susceptor particles are incorporated in the foamable composition in quantities sufficient to produce the heating action necessary to obtain the desired expansion of the foam composition. The susceptor particles may be compounds comprising, at least in part, electrically non conductive metallic oxides having thermohysteretic properties. The oxide compounds gamma $Fe_2O_3$ and $Fe_3O_4$ have been found to be particularly useful susceptors. $CrO_2$ may be used. Ferrite materials may also be used.

In addition to their high heat generating properties by hysteresis losses, such compounds may be reduced to extremely small size. The size reduction is without loss of heat generating properties. The size reduction minimizes any tendency of the susceptor particles to settle out and facilitates handling and compounding by known existing equipment to the ends of economy and commercial production. Metallic oxide susceptors may be reduced to submicron particle sizes, for example, 0.01 microns. Typically, the particles might range in size from submicron to 20 microns. However, since a fewer number of large particles will provide the same particle loading as a large number of small particles, under certain circumstances, large particles may be employed to reduce coloration of the foam composition. Such large particles may have sizes ranging up to 250 microns.

When the induction generator is energized, the high frequency magnetic field established by the work coil penetrates throughout the chemical mixture and creates a thermohysteretic effect in the susceptor particles. Each particle becomes heated on an individual basis and this heat immediately being conducted into the contingent and surrounding chemical mass.

The magnetic field has a negligible or zero effect directly on the intermediate chemical composition itself in the normal case since there is no effective mechanism by which heat is generated in such organic material by means of a magnetic field. Thus the main volume of the chemical composition remains cool while sufficient local temperature rises occur at each particle to initiate local release of gas. When the magnetic field intensity is high enough, it is believed that considerable foam development can occur in this manner with relatively little heat development in the general body of the foaming chemical. Thus it can be seen that this unique attribute differs drastically from both the microwave or dielectric method and the conventional oven method in which no choice exists but to develop heat throughout the entire mass.

Further, as the foaming proceeds, the relative density of the susceptor particles decrease due to the expansion of the chemical composition. This tends to decrease the heat generated per unit of volume providing a measure of self regulation to the heating process which avoids heat degradation or damage to the chemical composition.

The unique property of localized heat generation of the present invention will be found to offer possibilities for entire new classes of foaming materials that could not be used previously because of excessive heat damage. In fact, it is even likely that those skilled in the art can select a number of obvious individual compounds or one-component substances into which the heat generating particles can be mixed to provide a new product. In this new product, the local heat generation action by the particles will be obtained in a manner simply to produce local vapor pockets of vaporized substance which will persist and become the cells of this one-component foam. Alternatively, local heat decomposition can produce vapor or gas pockets in a one-component mass to cause it to foam.

Additional improvements and advantages result from the unique characteristics of the induction foaming method of the present invention. When the attempt is made to apply dielectric and microwave approaches of past methods to foaming of mixtures that contain a certain amount of ionized liquid, it is found that the electrically conductive quality of the liquid can in effect "short circuit" the applied electric field resulting in seriously reduced heating rate in the liquid. With the method of the present invention, on the other hand, those skilled in the art will recognize that the liquid mass to be foamed can actually become quite conductive electrically without seriously hampering the penetration of the magnetic field of the present approach.

By means of the induction work coil of the present invention it is convenient to apply the heating action to local areas of a body to be processed as well as broad areas. Because the magnetic field of the work coil is highly concentrated near the conductors in some coil designs, the local heating rate near the conductors can be much higher than realised by a microwave chamber for example.

EXAMPLE - FOAMING

The present invention was practiced by means of a simple polystyrene system. Some sheet polystyrene material (Monsanto's Polyflex) was softened by means of contact with the heated rolls of a mixing mill. When the polystyrene had become softened and could be worked into a flexible mass on the rolls, magnetic iron oxide particles were added and milled uniformly into the polystyrene. Although iron oxide particles were used in this example, other materials offering high hysteresis-loss, such as certain ferrites, and magnetic chromium oxide, etc., can be used instead as will be recognized by those skilled in the art.

In the example, black magnetic iron oxide was added to the polystyrene in a quantity representing 50 parts by weight oxide to 100 parts polystyrene. The oxide was number MO-4232 obtained from the Minerals and Pigments Division of Chas. Pfizer & Co. The oxide offers particle sizes in the pigment range averaging less than 1 micron in diameter and thus easily handled on conventional milling machinery.

After the iron oxide was uniformly dispersed in the softened polystyrene, the mixture was placed between the heated platens of a press and sheeted out to a flat specimen that measured approximately 0.007 inch in average thickness. Sometime after this sheet had cooled, induction heating according to the present invention was carried out to make a foamed polystyrene specimen as follows. The procedure consisted first of permitting a low-boiling hydrocarbon ("petroleum ether") to impregnate the sheet at room temperature. An amount of hydrocarbon up to about 10% by weight can be introduced into the polystyrene sheet in this manner. Subsequent exposure to heat then vaporizes the entrapped hydrocarbon. When the polystyrene becomes warm enough to become soft, the trapped vapors expand and produce foam. Foaming of polystyrene by vaporization of trapped liquids is known, and many other types of foam procedures could have been selected for use in the example without departing from the invention.

The particular hydrocarbon used for this polystyrene example was Petroleum Ether number 9273 by J. T. Baker Chemical Co., with a boiling range of 60 to 110°C. The polystyrene sheet was bathed with the hydrocarbon some half dozen times and allowed to sit partly submerged over several days in which the specimen was intermittently wet and dry. (The hydrocarbon tends to remain once it enters the polystyrene.) The specimen became flexible and swelled to about 0.012 inch thickness.

Figure 2:
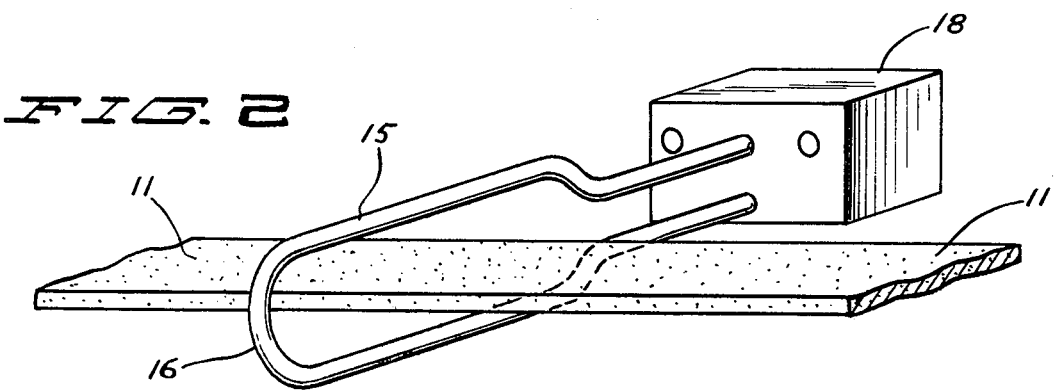
FIG. 2 is a diagrammatical view schematically showing the mass of the susceptor-impregnated material being passed through an open hairpin-type induction heating coil.
Figure 3:
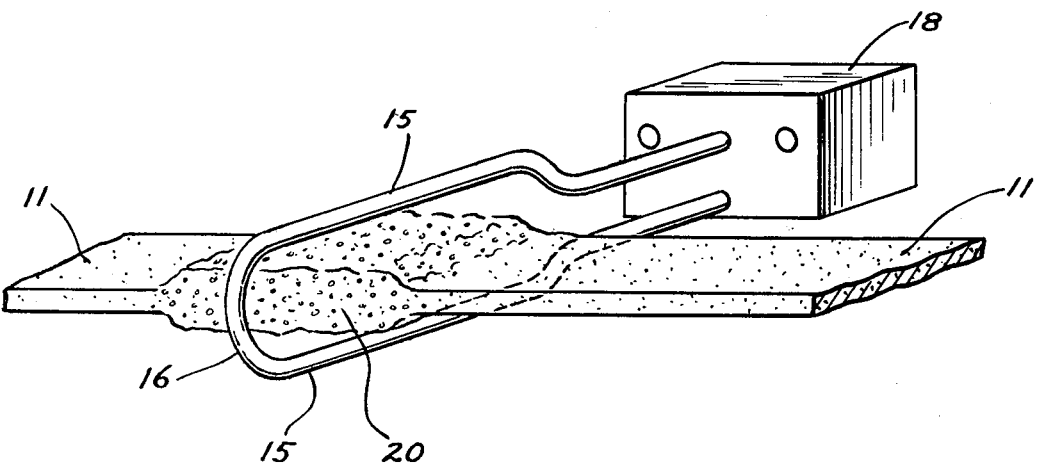
FIG. 3 is a view similar to FIG. 2 showing schematically the foaming action obtainable from the particular example of our invention illustrated.

To produce foamed polystyrene, the specimen 11, of FIG. 1, containing iron oxide particles 12 was placed in the open space between the conductors 15 of a hairpin-type induction heating coil 16, shown pictorially in FIG. 2. The conductors were of 3/16 inch tubing and spaced about 3/16 inch apart. The coil was connected to a 10-kw induction heater 18 operating at 3.5 MHz. The induction equipment was energized for about 1 second. The polystyrene specimen immediately transformed into an irregular foamed mass 20, of FIG. 3, about 1/16 inch thick. No attempt was made to mold the polystyrene into any particular shape. The experiment was repeated with similar results by placing a specimen on a coil loop instead of between conductors. A thicker piece of polystyrene prepared in a similar manner but not originally pressed into a sheet was also expanded by the method of the present invention. It expanded from approximately 0.07 inch to 0.16 inch, but a greater degree of rise would probably be available in a controlled system.

To assist the user of this invention, a study of the induction hysteresis technology has indicated several factors that could be helpful. It is desirable for the magnetic field strength of the induction heating coil to exceed 50 oersteds and preferably to exceed 100 oersteds to get the fastest heating. A thicker mass containing the heat-generating particles will heat faster than a thinner one, probably simply because more heat-generating material is then present. A higher concentration of particles in the mass also promotes faster heating. The alternating magnetic field may range in frequency from 0.4 to 5000 megahertz. Typically the frequency range of the field will range from 2 MHz to 30 MHz for the conventional helix-type of induction coil.

Turning now to FIGS. 4 through 7, there is shown therein the practice of the present invention in connection with the joinder of a foam member plug in the cut out area of a foam member sheet.

In the Figures, the numeral 22 indicates a foam member sheet. Sheet 22 may be formed of any commonly available plastic material, such as expanded polystyrene. Sheet 22 contains a cut out area 24 which formerly contained a void or other imperfection. Area 24 may be removed by a die, knife, or other means to provide surface 26.

A plug 28 may be formed from similar material to have surface 30 for mating with surface 26 of cut out area 24. (see FIG. 5)

As shown most clearly in FIG. 6, a foamable composition 32 is applied to one or both of surfaces 26 and 30. Composition 32 is formed of a foamable liquid. Such liquid may typically include those of the urethane family or the vinyl plastisols. Since mechanical compression or interlocking is the bonding mechanism the foamable liquid is not selected for its adhesive properties. In such an application, it may be desirable to reduce the cell size of composition 32. This may be accomplished by proper formulation of composition 32.

A blowing agent is incorporated in the liquid of foamable composition 32. This agent may be a solid granular material such as ABFA (azobisformamide) or azodicarbonamide which decomposes to form a gas in a range of from 160° to 200°C. In the alternative, a liquid having a low boiling point, such as Freon 11 (dichlordifluoromethane), may be used as the blowing agent in foamable composition 32.

There is also added to foamable composition 32 susceptor particles 12 (see FIG. 1) of the type described above. Susceptor particles 12 are incorporated in foamable composition 32 in quantities sufficient to produce the heating action necessary to raise the temperature of the blowing agent to the decomposition temperature. This is typically 5 to 50% by weight with respect to the foamable liquid of the composition.

After foamable composition 32 has been applied to one or both of surfaces 26 and 30, sheet 22 and plug 28 are juxtapositioned so that the surfaces to be joined are closely adjacent. The surface or surfaces containing foamable composition 32 is then exposed to an alternating magnetic field, such as that produced by coils 15, as shown in FIG. 6. Coils 15 may be cooled by coolant circulated in passages 34 to prevent any possible scorching or degradation of the foam members.

Upon insertion in the field of coil 15, susceptor particles 12 undergo heating, increasing the temperature of foamable composition 32 to the decomposition temperature of the blowing agent. The gas generated by this decomposition causes foaming of composition 32 to effect joinder of sheet 22 and plug 28. Thereafter, sheet 22 may be removed from coils 15 and the joinder process is complete, as shown in FIG. 7.

Various modes of carrying out the invention are contemplated as being within the scope of the following claims particularly pointing out and distinctly claiming the subject matter which is regarded as the invention.

We claim:

1. A method of filling an internal void in a unitary foam material sheet with a plug of similar foam material by compressive mechanical interlocking engagement, said foam material being capable of resisting compressive forces of the magnitude necessary to secure engagement, said method comprising the steps of:
    forming a first continuous joinder surface along the internal periphery of the void;
    forming the plug with a second joinder surface along the exterior surface thereof suitable for being placed opposite said first joinder surface, said plug being formed of a size such as to form a predetermined volume between said joinder surfaces when the latter are opposing;
    dispersing fine susceptor particles consisting of electrically non conductive, metallic oxides quickly heatable upon exposure to an alternating magnetic field and having an average size between submicron and 20 microns in a non adhesive foamable liquid to form an expandable composition, said particles being incorporated in quantities sufficient to heat the composition to the foamable condition;
    inserting the plug in the void so that the joinder surfaces are opposing to define the predetermined annular volume;
    applying a sufficient quantity of the expandable composition to at least one of the joinder surfaces to provide expansion in excess of the predetermined volume upon heating; and
    exposing the joinder areas to an alternating magnetic field while retaining the foam members in position, said magnetic field being of sufficient strength, frequency, and duration to quickly heat the particles and expand the composition into compressive, mechanical interlocking engagement with the joinder surfaces, thereby to secure the plug to the sheet.

2. The method of claim 1 wherein the step of forming the expandable composition further includes the step of providing a liquid expandable into a foam of sufficiently small cell size to obtain the compressive mechanical interlocking engagement.

3. The method according to claim 1 wherein said composition is expandable by internal gas production upon the application of heat thereto and upon subjecting the composition carrying the particles to an alternating magnetic field, the composition foams into many small gas pockets.

4. The method according to claim 1 wherein the step of dispersing the susceptor particles is further defined as dispersing particles of substantially pure iron oxide in said composition.

5. The method according to claim 1 wherein the step of dispersing the susceptor particles is further defined as dispersing 5 to 50% particles by weight with respect to the foamable liquid.

6. The method according to claim 1 wherein the step of exposing the composition to an alternating magnetic field is further defined as exposing the composition to an alternating magnetic field having a frequency of between 0.4 and 5000 megahertz.

7. The method according to claim 6 wherein the exposing step is further defined as exposing the composition to an alternating magnetic field having a frequency of between 2 and 30 megahertz.

8. The method according to claim 1 wherein the exposing step is further defined as exposing the composition to an alternating magnetic field having an intensity in excess of 50 oersteds.

9. The method according to claim 8 wherein the exposing step is further defined as exposing the composition to an alternating magnetic field having an intensity in excess of 100 oersteds.

* * * * *